May 20, 1952 W. F. PRAY 2,597,259

STABILIZATION OF CONTROL AMPLIFIERS

Filed Oct. 13, 1949 2 SHEETS—SHEET 1

WILBUR F. PRAY
INVENTOR.

BY [signatures]

ATTORNEYS

May 20, 1952 W. F. PRAY 2,597,259

STABILIZATION OF CONTROL AMPLIFIERS

Filed Oct. 13, 1949 2 SHEETS—SHEET 2

WILBUR F. PRAY
INVENTOR.

BY [signature] [signature]
ATTORNEYS

Patented May 20, 1952 2,597,259

UNITED STATES PATENT OFFICE 2,597,259

STABILIZATION OF CONTROL AMPLIFIERS

Wilbur F. Pray, Hastings on Hudson, N. Y., assignor to Askania Regulator Company, a corporation of Illinois Application October 13, 1949, Serial No. 121,183

4 Claims. (Cl. 121—41)

This invention relates to stabilization arrangements for power control systems that include control amplifiers of the kind that proportion magnitude of power output to magnitude of a signal applied to a control input, and that include two or more signal systems that selectively are effective, to apply a signal from a single selected signal system to the amplifier control input.

Stabilization commonly is used in power control systems having control amplifiers, and has been applied in many ways and for various purposes. Probably the most usual type of stabilization is accomplished by opposition of a proportional signal to amplifier response, to the primary or actuating signal initiating such response by follow-up means; for stabilization of the system by proportioning magnitude of power output, or magnitude of operating response of the system, to magnitude of the primary signal. To render the proportioning signal fully effective, provision usually is made for opposing it directly to the primary signal as the latter is applied to the control input of the amplifier. Commonly, the primary signal and follow-up systems are arranged to exert signal forces in opposite directions on a movable member that constitutes the control input of the power-controlling amplifier.

In many situations in control industries it is necessary or desirable to arrange a control amplifier for cooperation with plural signal systems and to make provision for rendering effective one of such signal systems at a given time or under given conditions, control by one such system being complete and exclusive of any signal produced by the other signal system or systems. Arrangements for selecting and rendering a single one of plural signal systems effective, and for rendering the other systems ineffective, may vary widely, and numerous proposals have been made for accomplishing such operation. One proposal of this kind has been to arrange each signal system to produce signals of the same kind, and to so arrange the outputs of such signal systems relative to the amplifier control input and to each other, that the output of only one at a time can have an actuating effect on the control input. Selection of the particular system that controls the amplifier may be by relative magnitude ranges of the respective signal outputs.

The arrangment may be such that each signal system can be effective for control of the power amplifier only when the magnitude of its output is within a given predetermined range, and becomes ineffective when its output is outside that range. Additionally, the signal system arrangement may be such that a definite order of superiority exists between the signal systems, so that when the output of a superior system enters its effective range such output wrests control from an inferior system, wholly excluding the latter from control even though its output may be within the range of its primary effectiveness.

Frequently it is desirable or necessary that a sharply defined crossover action occur when one signal system takes over from another. It has been discovered, however, that in such a plural signal system arrangement, provided with follow-up means of conventional arrangement that operate to reduce effectiveness of a control signal by opposing it, a "droop" occurs about the crossover point, that is to say, the signal system that is to assume control, instead of remaining completely ineffective until the crossover point is reached, becomes partially effective before its output has reached the magnitude at which it should assume control.

In other words there is a band adjacent the theoretical crossover point wherein the system that is approaching the limit of its effective range, at which limit it relinquishes control, and the system that is approaching entry into its effective range, but that should remain ineffective until entry into such range, both assume partial control.

This invention is based on the discovery that this disadvantageous droop effect, or overlap of control by two signal systems, arises in a multiple signal system arrangement when use is made of the common prior practice of opposing the response-proportioning signal to the primary signal as the latter is applied to the control input of the amplifier, as by applying both signals in opposed relation to the amplifier control member.

A primary object of the invention is provision of a novel proportioning signal applying arrangement in a power control system having a control amplifier and multiple signal systems, which will avoid droop, or overlap of control by two signal systems at crossover of control from one signal system to another.

Another object is the provision of such an arrangement that is adaptable to use with a wide variety of conventional response-proportioning mechanisms that have been developed to accomplish various purposes in single signal system power control devices, to permit successful use of such mechanisms with multiple signal system arrangements.

Still another object is the provision of such an arrangement that operates by providing an individual response-proportioning or follow-up system to each signal system, from a common proportioning signal system, and that is effective to apply the proportioning signal to the particular signal system that is in effective control of the amplifier, and that applies such proportioning signal to the signal system independently of the control amplifier signal input.

Figures 1, 2:
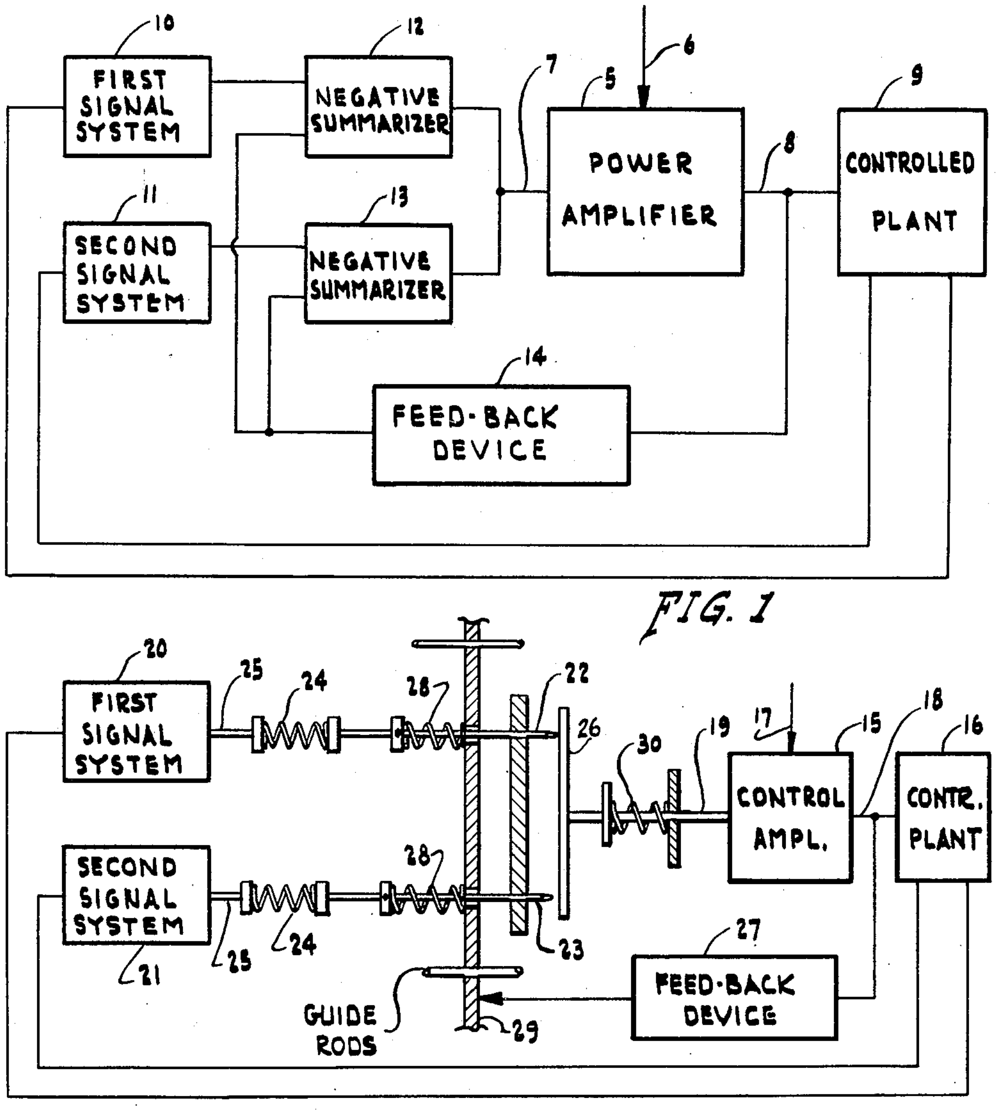
Fig. 1 is a block diagram showing the type of system arrangement comprising the invention.
Fig. 2 is a diagram partly schematic and partly in block form showing application of the invention to a system wherein control and feedback systems comprise forces of variable magnitudes.

Describing the drawings in detail and first referring to Fig. 1, a control amplifier of convention form is designated 5. Such amplifier has a power input 6 and a signal input 7 that is arranged to impose on the amplifier an actuating signal that controls the magnitude of power delivered by the output 8 of the amplifier. Such power amplifiers are well known and occur in a tremendous number of forms.

A typical use of a power control amplifier is for controlling the operation of a plant, such as that designated 9 in Fig. 1, which may be any physical mechanism, device or system. For such use a signal system is arranged to be responsive to a selected operating condition of the plant, and to actuate the control amplifier upon departure of such condition from a predetermined state, to so control the plant as to return the condition to the desired state. Due to time lag between control amplifier actuation and corresponding change of the plant condition, such systems have inherent hunting characteristics. Stabilization by reducing the effectiveness of the input control signal in proportion to magnitude of response to it by the control amplifier has been used effectively to eliminate such hunting. Standard practice has been to arrange the system for so reducing input signal effect so that its input is energized by the power output of the control amplifier, as 8 in Fig. 1, and to deliver to the control amplifier signal input, as 7 in Fig. 1, a signal of a magnitude proportional to the magnitude of the power output, and delivered to the signal input in opposition to the primary control signal. By this practice, the control amplifier output is directly proportioned to the actuating signal magnitude and the latter being proportional to the plant condition error, the resulting change of power applied to the plant is proper for correcting the error, and hunting due to time lag of plant operation is eliminated.

In the system of Fig. 1, two signal systems 10 and 11 are disclosed and they may be so arranged as to be responsive to different operating conditions of the plant 9 and additionally so that selection of the particular signal system that is in control of the amplifier at any time is accomplished in any suitable and known manner. It has been discovered that in any system of this kind, as the response-proportioning signal is applied in direct opposition to the primary control signal at the signal input to the control amplifier, an undesirable overlap of control by the two signal systems is introduced, and instead of sharply defined crossover point of transfer of control from one system to the other, a band is produced wherein both signal systems exert partial control. This invention is based on the discovery that such band can be reduced to negligible width by the simple expedient of opposing the response-proportioning signal to the individual outputs of the signal system, rather than to the signal input to the control amplifier. Such opposition can be simply and effectively accomplished by negatively summarizing the response-proportioning signal with each of the signal system outputs in advance of application of the output of the controlling signal system to the amplifier. A system arrangement for accomplishing this type of operation is shown in Fig. 1, comprising independent summarizers 12 and 13 each having one of its inputs connected to the output of the follow-up device 14, and each of the summarizers having its second input connected to the output of one of the signal systems 10, 11. The outputs of two summarizers are applied to the signal input to the control amplifier in accordance with well known prior practice.

As a simple, explanatory further disclosure of the system type presented by the invention, Fig. 2 discloses the invention applied to a control amplifier arrangement wherein the primary and response-proportioning signals consist of forces of variable magnitudes, a type of system that is widely used because of the convenience of stabilization by opposition of primary and response-proportioning signal forces to produce a resultant amplifier-controlling signal force. In Fig. 2, the control amplifier 15 controls magnitude of power delivered to a plant 16, the power input to the amplifier and the power output of the latter respectively being designated 17 and 18. The control amplifier has a mechanically movable signal input member 19, the position of which depends on magnitude of force applied to it, and determines the magnitude of power delivered by the amplifier 15 to the plant 16.

The system includes a pair of signal generating devices 20, 21 that are responsive to plant operation, as by being respectively responsive to two different plant conditions or to different ranges of magnitude of a single plant condition, and that have output members 22, 23 respectively arranged to exert upon the signal input member 19 forces representative of the conditions to which they are responsive. The signal systems may be of any of the well known forms suitable for translating magnitudes of the plant conditions to which they are responsive to forces of proportional magnitudes. Springs 24 form convenient and well known devices for translating positions of members 25 into forces for delivery by the output members 22, 23 in case the systems 20, 21 have outputs of position type. Selection between control by one or the other system 20, 21 may be made by arranging the members 22, 23 relative to each other and to a contact element 26 carried by the signal member 19, so that within the range of control of either system the range of movement of its output member is such as to maintain the element 26 out of contact with the output member of the other system.

The response-proportioning or follow-up mechanism 27 is arranged in accordance with any of various well known elements to translate magnitude of the power output of the control amplifier 15 into a force of proportional magnitude. Practice of the invention is accomplished by applying the response-proportioning force to the output members 22 and 23 so that it is opposed to the force exerted on such members by the signal system and opposed to the signal force that is at the moment in control of the amplifier 15. Such application of force conveniently may be accomplished through springs 28 interposed between the signal system output members 22, 23 and an output member 29 of the follow-up mechanism, which member 29 is moved by the mechanism 27 in proportion to changes in output power of the amplifier and to positions corresponding to the magnitude of such power. This type of application of response-proportioning force has been found to substantially eliminate the overlap of control of the two systems as the point of transfer of control between them is approached. A return spring 30 is arranged to maintain the element 26 of the signal input member 19 in contact with the more advanced one of the signal system output members 22, 23.

Figure 3:
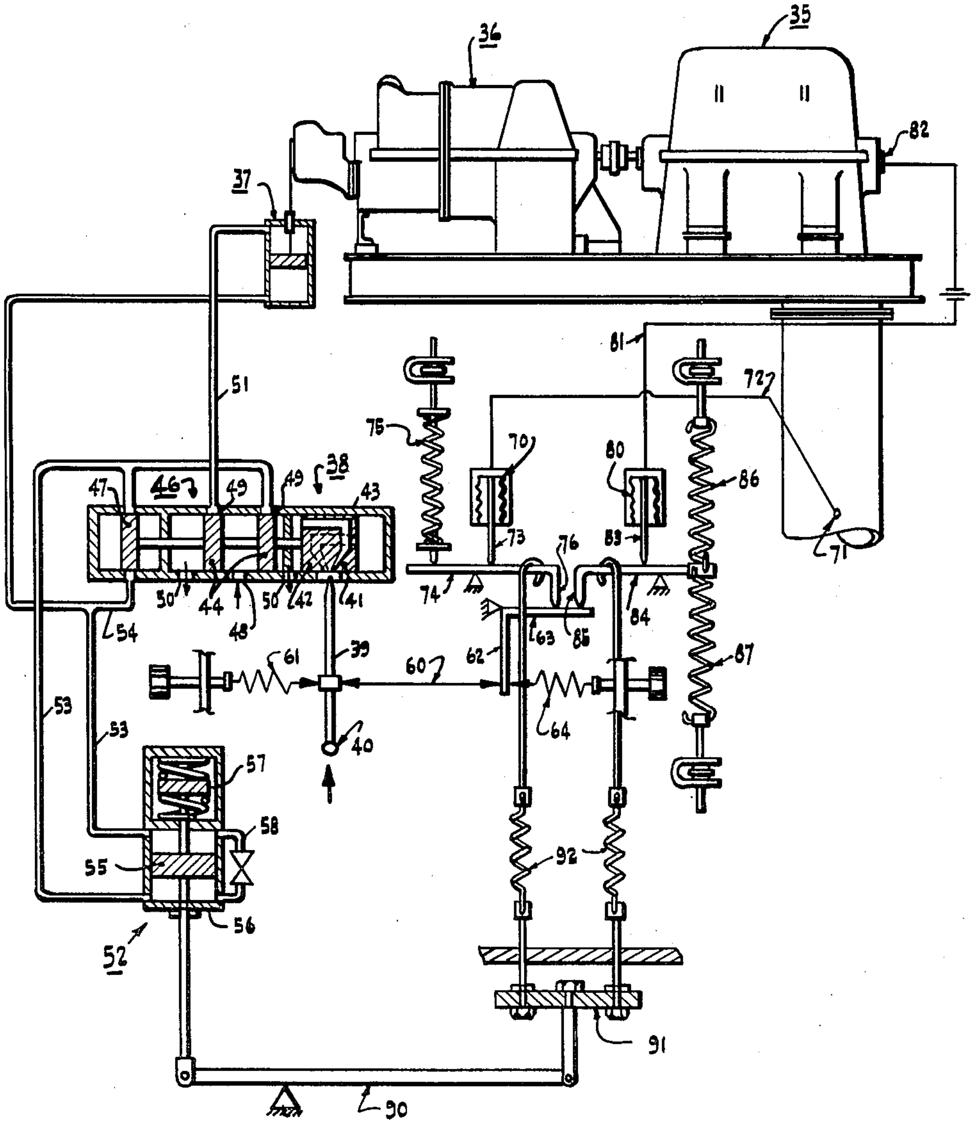
Fig. 3 is a schematic diagram showing application of the invention to a specialized control system for a motor-driven fluid-delivery pump.

Fig. 3 discloses a complete system for controlling speed of a fluid delivery turbine in two distinct ranges of turbine speeds. The system is so designed that within a lower turbine speed range control is responsive to pressure of fluid delivered by a compressor driven by the turbine and is designed to maintain such pressure at a constant level under variable load or demand, while within an upper range of turbine speed, control is responsive to turbine or compressor speed and is designed to restrict such speed to a definite upper limit.

The compressor, designated 35, is driven by a turbine 36 and a turbine speed control is actuated by a hydraulic piston and cylinder assembly 37, movement of the piston in opposite directions respectively increasing and decreasing speed of turbine 36. The assembly 37 is controlled by a so-called "jet-pipe regulator" assembly 38. This assembly, which is well known, comprises a jet pipe 39 that is pivoted to swing about an axis 40 in the plane of movement of a pair of distributor ports 41 in an auxiliary piston 42, such ports being cross-connected to the opposite ends of the piston for delivering fluids to opposite ends of a cylinder 43 within which piston 42 is slidable. The arrangement is such that when fluid under pressure is delivered to the ports 41 by the jet pipe 39 the piston 42 will follow angular movement of the jet pipe due to unbalance of pressure in the cylinder ends resulting from delivery of fluid to the respective ports at different volume rates when the jet pipe is moved. The valve body 44 of a conventional four-way spool type pilot valve assembly 46, and the body 47 of a variable orifice assembly are movable by the auxiliary piston 42. Power fluid is delivered to the pilot valve assembly 46 through an inlet port 48 and selectively to one or the other or neither of a pair of control ports 49 in accordance with the position of the valve body 44. When the valve body is in a position to establish communication between the inlet port 48 and one control port 49, the other control port is connected to a corresponding one of a pair of exhaust ports 50. One of the control ports is connected by a line 51 to one end of the cylinder of the speed control assembly 37, the other is connected to the opposite end of such assembly through a stabilizing device 52, by lines 53. A by-pass line 54 is connected across the stabilizing device 52 by way of the variable orifice assembly.

The stabilizer assembly 52 comprises a piston 55 in a cylinder 56 the opposite ends of the latter being connected by lines 53 with one of the control ports 49 and the second end of the piston and cylinder assembly 37, so that the piston 55 of the stabilizer assembly moves in proportion to movement of the piston of the assembly 37. A return spring 57 system biases piston 56 to a central or neutral position, a valved by-pass line 58 connected between the ends of cylinder 57 permitting timed return of the piston to its central position by spring system 57 after its displacement.

The stabilizing system, comprising the jet pipe and auxiliary piston, the variable orifice and pilot valve, and the stabilizing piston, form part of a stabilizing system which is fully disclosed and claimed in United States Patent to Herbert Ziebolz, No. 2,312,464, dated March 2, 1943, and is a highly refined proportional plus reset type of system that operates to proportion distance of movement of the piston of the output assembly 37 to degree of deflection of the jet pipe.

In the system of Fig. 3, a signal force is applied to the jet pipe 39 through an axially movable rod 60, a light return spring 61 being arranged to maintain the jet pipe in contact with such rod. Force is applied to rod 60 through the output arm 62 of a bell crank, the input arm 63 of which serves as the common signal input member of the control amplifier system comprising the jet pipe 39, auxiliary piston 42 and pivot valve assembly 46. A return spring 64 is arranged to cooperate with spring 61 to maintain the jet pipe 39 in its neutral position, wherein pilot valve 46 is in a cut-off condition, in absence of a signal force.

The pressure responsive signal system that controls the jet pipe 39 in the lower speed range, to maintain a constant selected pressure of fluid delivered by the compressor 35, comprises a bellows 70 the interior of which is connected to the turbine delivery line 71 by a conduit 72, so that the axial position of an output rod 73 of the bellows corresponds to the magnitude of pressure in the line 71. Output rod 73 is arranged to position a lever 74, an adjustable spring 75 being arranged to fix the range of movement of the lever within a selected range of force delivered by bellows 70 through rod 73. Lever 74 is provided with an output member 76 arranged to contact the input arm 63 of the jet pipe controlling bell crank, and so to deliver to the jet pipe through the bell crank the force output of bellows 70.

The speed-responsive signal system comprises a bellows 80 the interior of which is connected by a line 81 with the pressure output of a hydraulic tachometer 82, of conventional form arranged to deliver an output hydraulic pressure proportional to speed of its mechanical input, which is driven by the turbine motor or compressor. Bellows 80 is provided with an output rod 83 arranged to contact a lever 84 that serves as the output member of the speed responsive signal system, and that is provided with a transfer member 85 arranged to contact the input arm 63 of the jet pipe control bell crank and thus deliver to the jet pipe through the bell crank the force output of bellows 80.

A system of opposed speed control springs 86 and 87 is arranged to select the range of turbine speed within which bellows 80 is in control of the system, and to provide an upper limit to turbine speed. In Fig. 3 springs 86, 87 are shown as being tension springs, disposed to exert opposed forces on lever 84, respectively opposing and aiding force delivered to the lever by bellows 80. Spring 87, opposing the force of bellows 80, serves to set the upper speed limit of the turbine. Spring 86, aiding the force of bellows 80 may be adjusted for any speed less than the maximum, and when pressure within bellows 80 is less than that representing the speed for which spring 86 is adjusted, the resultant of the forces of springs 86, 87 is such as to maintain the output member 85 out of contact with the input bell crank arm 63. In such condition of the speed responsive signal system the bell crank is under sole control of the turbine output pressure-sensitive bellows 70. Upon increase of the turbine speed to that for which spring 86 is set, due to reduction of compressor output pressure by increasing demand the speed-representing pressure within bellows 80 moves the output member 85 of lever 84 into contact with the bell crank input arm, and turbine operation at further increased speed is under sole control of bellows 80. Since increasing demand during speed controlled operation is accompanied by decrease of output pressure, the output member 76 of the pressure-responsive signal system is maintained out of contact with bell crank arm 63, and the pressure system can exert no effect on the control amplifier.

In an actual system of the general arrangement disclosed by Fig. 3, but with the stabilizing output arranged in the conventional manner of a single signal system arrangement, as disclosed by the above-noted patent, with the stabilizing signal applied direct to the jet pipe through a spring located in the position of the return spring 61 of Fig. 3 and actuated by the stabilizing piston corresponding to piston 55, it was discovered that an overlap of control by the two signal systems occurred. For example, with the speed-responsive signal system springs set to take over control at a turbine speed of 6200 R. P. M., control by the speed-responsive signal system began to be effective at about 5200 R. P. M., resulting in overlapping control by both systems in a range extending from 5200 R. P. M. to the upper speed limit of 6200 R. P. M., and interfering with maintenance of the desired constant turbine output pressure throughout this range wherein it was intended that turbine output pressure alone should control.

Apparently the explanation of this condition, found to occur in the conventional system, is that, under speed control the system delivering signal force to the jet pipe comprises bellows 80, spring 64, one or the other of springs 86, 87, and the spring delivering the stabilizing force to the jet pipe, the latter occupying approximately the position of return spring 61 and having been controlled by the output of stabilizing assembly 52. When the pressure responsive system was in control, the force-exerting system comprised bellows 70, and springs 75 and 64, and the stabilizing spring that, as stated above, occupied the position of spring 61 and was actuated by the stabilizing assembly. The inclusion of spring 64 and the stabilizing spring in both systems appears to have upset the speed-responsive system when inoperative, unbalancing it, primarily by the effective removal from it of the signal-resisting force occurring upon exertion of the pressure-control signal force in oppositon to the force of the stabilizing spring. Removal of this speed signal-resisting force exerted by the stabilizing springs appears to have permitted the speed signal to become partially effective, through exertion of a speed-representing force on the bell crank arm 63 at a speed materially less than that for which adjustment of the speed-signal system had been made.

This undesirable type of operation is eliminated by the arrangement disclosed by Fig. 3, made in accordance also with Figs. 1 and 2. The arrangement comprises connecting the output of the stabilizing assembly 52 directly with each of the two signal system outputs, at such a point as to be effective upon the signals delivered by such outputs in advance of imposition of such signals upon the signal input to the control amplifier. To accomplish this arrangement motion of the stabilizing piston 55 is transmitted through two independent paths to the two signal system outputs. These two paths may be arranged in a variety of ways, and the point of their division may be arranged at any convenient location in the follow-up train between the output of the stabilizing device and the outputs of the two signal systems. In Fig. 3, a common transmission element is shown as lever 90 which is actuated by the output of the stabilizing piston 55, and which moves a crosshead 91. Position of this crosshead is translated into a response-proportioning signal force, proportional to magnitude of movement of piston 33, opposed to the primary signal output of each signal system, and, therefore, to the signal in control, by two springs 92 that respectively are connected between crosshead 91 and the signal system output members 76, 85. In Fig. 3, these springs 92 are shown with their output ends connected to the two levers 74 and 84 of the respective signal systems.

It will be seen that this expedient of connecting the stabilizing system outputs direct to the signal system outputs, independently of the common input to the control amplifier, eliminates effective transfer of a common stabilizing follow-up system output spring from the non-controlling to the controlling signal system, and consequently avoids the change of signal force sources of a system that otherwise occurs when such system relinquishes control, by reason of the opposition, exerted by the system to which control has been transferred, of a force that destroys the effect of the stabilizing spring in the non-controlling system. The arrangement has been found to eliminate undesirable overlap of control, and to render transfer between control by the respective systems sharp and fully satisfactory. The return springs 61, 64 may be so light as to produce effects that are wholly negligible in producing the undesirable control overlap, and yet provide ample force to perform their intended return functions.

A further effort that flows from the division of the proportioning signal transmission train into separate paths respectively conducting the feedback signal to outputs of the individual signal systems is that compensation for different stability characteristics of the various signal systems may be made by giving the different paths individual characteristics respectively suited to the stabilizing requirements of the individual signal systems.

This, in the arrangement of Fig. 3, may be accomplished by using springs 92 of different characteristics respectively selected in accordance with the requirements of the two signal systems. It might equally well be accomplished by other modifying proportioning signal-transmitting elements located in other positions in the two feedback paths.

It will be readily understood from the above that the invention resides in a type of system arrangement rather than in any particular relation of specific elements, and that consequently the above disclosure is purely illustrative, and that the scope of the invention is to be determined by the appended claims rather than by the foregoing specific descriptions.

I claim:

1. In a system that includes a control amplifier having a signal input member movable to change the operating condition of the amplifier and plural signal systems each having a movable output member which respectively are arranged for selectively controlling the position of such member; stabilizing feedback means arranged to provide stabilization of control amplifier operation by any signal system without introducing material overlap of control by different signal systems at crossover of control from one to the other, said means comprising follow-up mechanism having an input for operation by the output of the control amplifier and being arranged to deliver an output signal proportional to magnitude of the control amplifier output, for exerting such output signal directly said follow-up mechanism having plural output members respectively connected with the respective signal system output members in opposition to the outputs of said signal systems and independently of the signal input member of the control amplifier.

2. In a system that includes a control amplifier having a signal input member movable to change the operating condition of the amplifier and plural signal systems each having a movable output member arranged relative to the control amplifier signal input member to move the latter for controlling the position of such member and the relative positions of such output members determining the identity of the signal system controlling the amplifier; means arranged to provide stabilization of control amplifier operation by any signal system without introducing material overlap of control by different signal systems at crossover of control from one to the other, said means comprising follow-up mechanism having an input for operation by the output of the control amplifier and an output member, and said mechanism being arranged to move said output member in proportional relation to changes in magnitude of control amplifier output, and plural springs, each connecting said mechanism output member to the output member of one signal system for exerting in opposition to the output of such system a force proportional to the output of the control amplifier.

3. In a system comprising a control amplifier having a signal input member movable to change the operating condition of the amplifier, and a lever pivotally mounted and connected with said signal input member for moving the latter in proportion to changes in its angular position, and plural signal systems each comprising an output member movable substantially in directions of swing of said lever and arranged to contact said lever and control its position, said signal systems being arranged for selective effectiveness in control of the lever position by interrupting operating connection of all but one of said output members with the lever; means arranged to provide stabilization of control amplifier operation by any signal system without introducing material overlap of control by different signal systems at crossover of control from one to the other, said means comprising follow-up mechanism having an input for operation by the output of the control amplifier and an output member, and said mechanism being arranged to move said output member in proportional relation to magnitude of control amplifier output, and plural springs, each connecting said mechanism output member to the output member of one signal system for exerting in opposition to the output of such system and independently of the control amplifier signal input member and lever a signal proportional to the output of the control amplifier.

4. A stabilized system for control of a hydraulic jet pipe relay by one of plural signal systems, without introducing material overlap of control by two signal systems upon crossover of control between them, said system comprising a main control lever connected to the jet pipe for moving it from a neutral position, a return spring biasing the jet pipe and lever to their neutral positions, plural signal system output levers respectively responsive to operation of the respective systems and selectively movable from inoperative relation with the main control lever into operative relation with said lever, said systems being relatively arranged to permit only a single lever to be operatively related with the control lever at any one time, means responsive to degree and direction of deflection of the jet pipe from its neutral position to control rate and direction of fluid flow, a stabilizing cylinder and piston assembly connected in the line of such fluid flow and having an output member movable in correspondence of degree and direction to rate and direction of fluid flow, and plural springs individually connecting said signal system output levers to the stabilizing assembly output member for exerting on said levers a force proportional to rate of flow, in opposition to the movement of the signal system output lever initiating such flow and independently of the main control lever and jet pipe.

WILBUR F. PRAY.

REFERENCES CITED

The following references are of record in the file of this patent:

UNITED STATES PATENTS

| Number | Name | Date |
|---|---|---|
| 1,594,959 | Huff | Aug. 3, 1926 |
| 1,887,335 | Sperry | Nov. 8, 1932 |
| 1,958,503 | Wintzer | May 15, 1934 |
| 1,962,676 | Albright | June 12, 1934 |
| 2,051,837 | Fischel | Aug. 25, 1936 |
| 2,258,278 | Carpenter | Oct. 7, 1941 |
| 2,312,464 | Ziebolz | Mar. 2, 1943 |